April 11, 1939.   G. C. SOUTHWORTH   2,153,728
ULTRA HIGH FREQUENCY SIGNALING
Filed Oct. 7, 1936   5 Sheets-Sheet 1

INVENTOR
G.C. SOUTHWORTH
BY
ATTORNEY

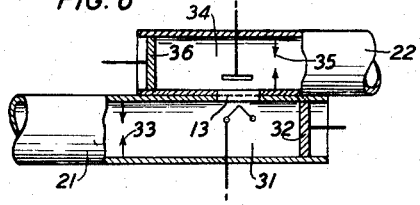
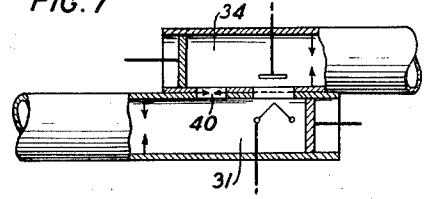
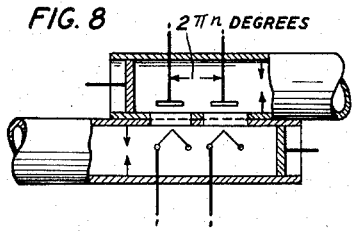
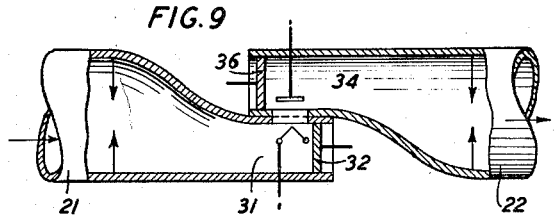
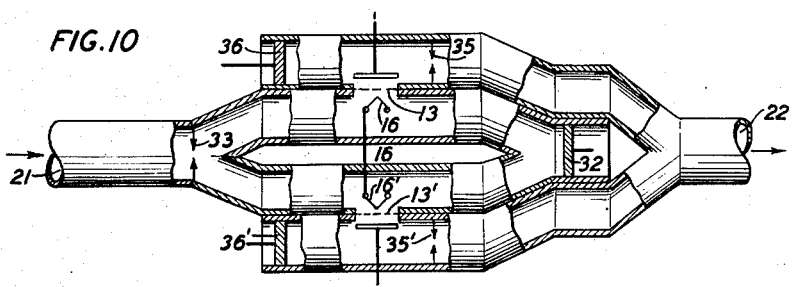
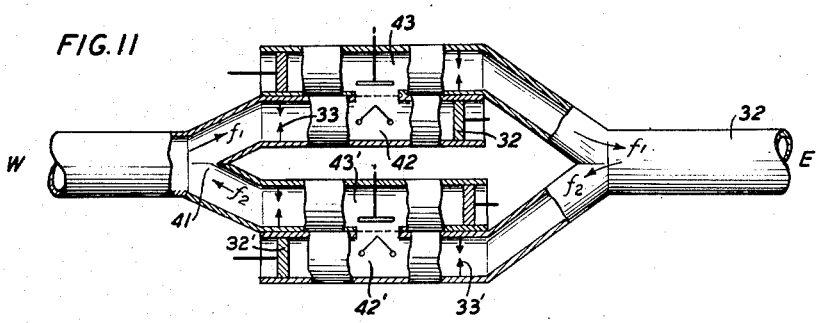

April 11, 1939. G. C. SOUTHWORTH 2,153,728
ULTRA HIGH FREQUENCY SIGNALING
Filed Oct. 7, 1936 5 Sheets-Sheet 3
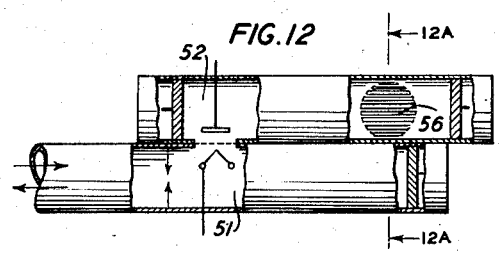
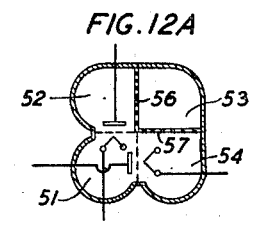
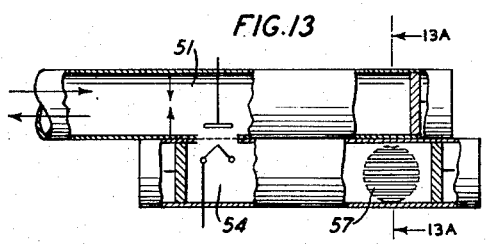
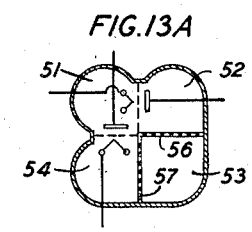
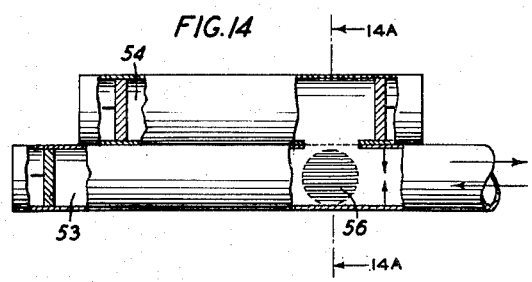
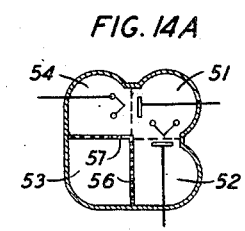
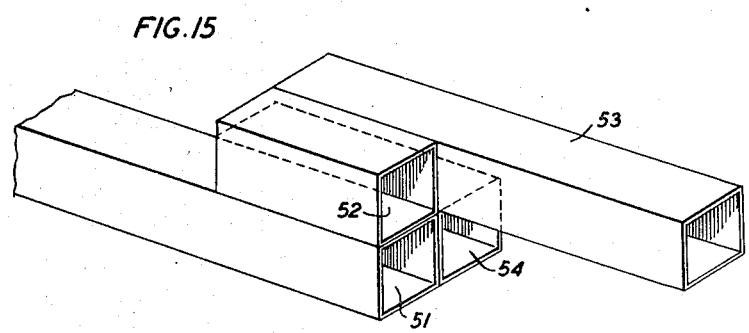
INVENTOR
G.C. SOUTHWORTH
BY
ATTORNEY

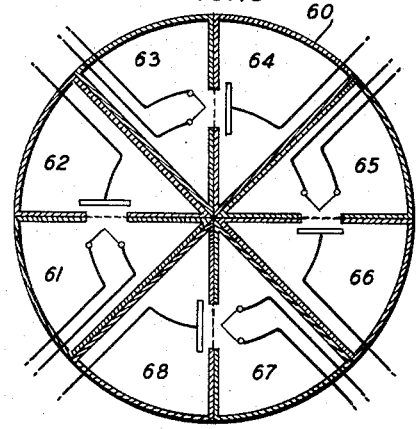

April 11, 1939.　　G. C. SOUTHWORTH　　2,153,728
ULTRA HIGH FREQUENCY SIGNALING
Filed Oct. 7, 1936　　5 Sheets-Sheet 5

INVENTOR
G.C. SOUTHWORTH
BY
ATTORNEY

Patented Apr. 11, 1939

2,153,728

UNITED STATES PATENT OFFICE 2,153,728

ULTRA HIGH FREQUENCY SIGNALING

George Clark Southworth, Red Bank, N. J., assignor to American Telephone and Telegraph Company, a corporation of New York Application October 7, 1936, Serial No. 104,524

36 Claims. (Cl. 178—44)

This invention relates to new and improved methods and means for ultra high frequency signaling. More specifically it relates to guided waves in a dielectric medium of limited boundaries and is a continuation in part of my application, Serial No. 73,940, filed April 11, 1936, which issued as U. S. Patent 2,106,771, February 1, 1938.

A general object of the invention is to provide means for applying vacuum tube technique to such dielectrically guided wave systems, having in mind the difficulties arising with the use of such high frequencies as are contemplated with dielectrically guided waves.

One specific object of the invention is to provide circuit arrangements using vacuum tubes of special design which will avoid such difficulties.

Another object of the invention is to provide amplification or other vacuum tube operations for such wave systems with appropriate impedance matching and with volume control.

Still further objects are the association of amplifiers with dielectric guides or sections of dielectric guides for amplification in a manner which eliminates effects due to non-linear characteristics of amplifiers, for multiplex signaling, for modulation of guided waves, and for generating high frequency oscillations of definite frequencies appropriate to such signaling systems.

All these objects and other objects and advantages of my invention will become apparent upon the consideration of a limited number of illustrations of my invention presented in the following specification and accompanying drawings.

The invention relates to such dielectrically guided waves as are described in my patent application Serial No. 661,154, filed March 16, 1933 which issued as U. S. Patent 2,129,711, Sept. 13, 1938 and other related applications.

Referring to the drawings:

Figs. 6 to 9 show steps of further development of the basic circuit of Fig. 2;

Fig. 10 shows my invention adapted for a pushpull circuit;

Fig. 11 shows my invention applied to a system for two-way signaling;

Figs. 12 to 15 are different views of an amplifying circuit for two-way signaling on the same carrier frequency;

Figure 22:
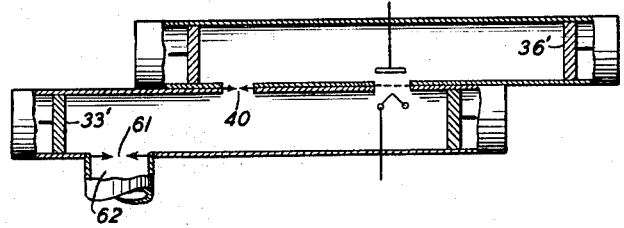
Figure 23:
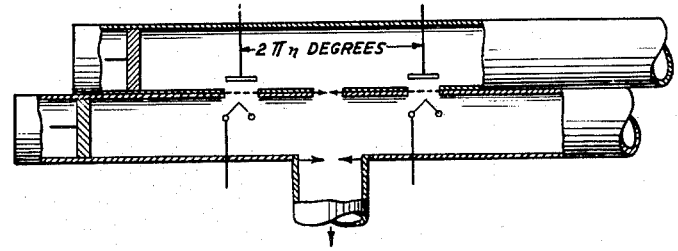
Figure 24:
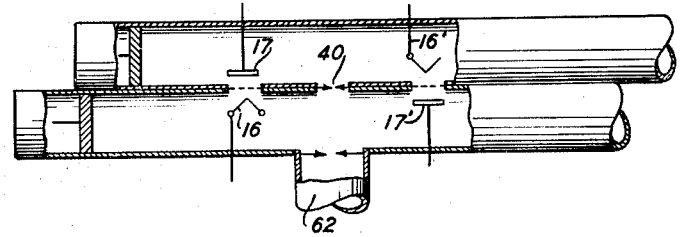
Figure 25:
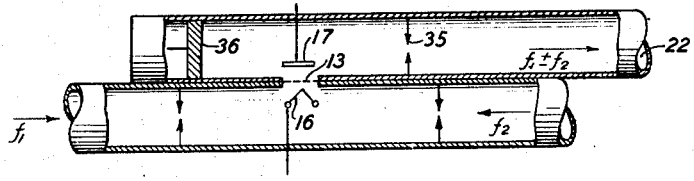
Figure 26:
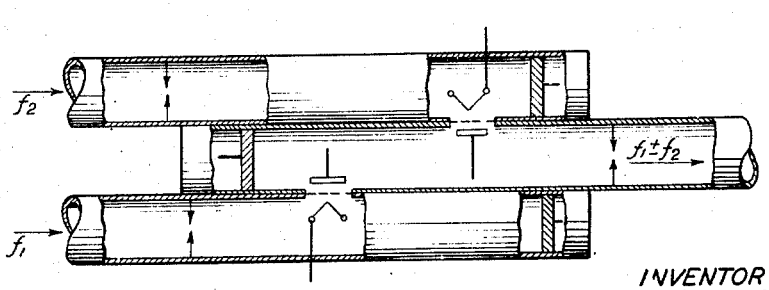

Figs. 16 to 21 relate to other modifications of my invention;

Figs. 22 to 24 illustrate the application of amplifier tubes for generating ocillations in sections of dielectric guides; and Figs. 25 and 26 show arrangements for obtaining modulation.

As pointed out in my copending application Serial No. 661,154 referred to above, there are several different types of waves that may be propagated through dielectric guides. These call for different arrangements of apparatus associated with the guide in order to better accommodate each of these waves. As regards the arrangements of the wave guides themselves, however, the fundamental principles are much the same for all types of waves. These principles can be illustrated by the specific examples chosen below which center around the so-called $H_1$ type of wave but the application to different types of waves will be apparent to those skilled in the art.

One of the limitations to the use of ordinary vacuum tubes as amplifiers of extremely high frequency is an uncontrolled coupling between the grid and the plate circuits that results from the priximity of the grid and plate circuits in the glass seal and other parts of the tube. An important feature of my invention as it relates to vacuum tube amplifiers resides in a vacuum tube of special design in which a very complete shielding of the output circuit from the input circuit is provided whereby undesired coupling between the two circuits is reduced to a low value. The tube may be either a triode or a multi-grid tube. In the first case the grid is a perforated metal septum that divides the tube into separate chambers. In the other the screen grid or some other grid performs a similar function. The metal septum comprising the grid extends through the walls of the glass envelope and is sufficiently large that if necessary it may be soldered or otherwise connected into a metal sheet of considerable expanse. By this means the two halves of the tube may be placed in separate compartments or chambers with no appreciable coupling except the electron flow through the grid and the very small amount of capacity effect through the meshes of the grid or screen.

Figure 1:
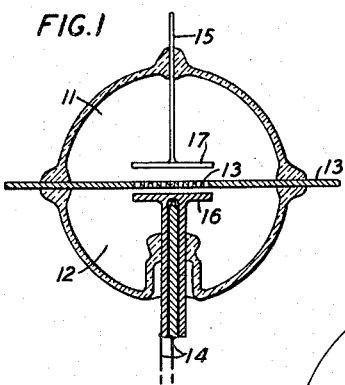
Fig. 1 shows a special design of vacuum tubes adapted for carrying out my invention.
Figure 1A:
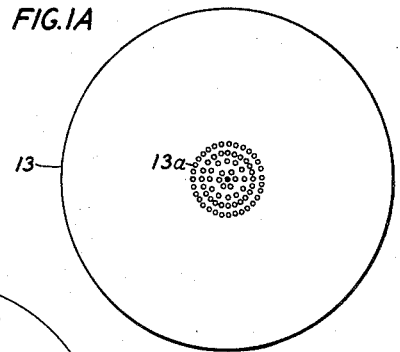
Figs. 1A to 1D show forms of grid structure for use in such a vacuum tube and adapted in some cases to be selectively responsive to certain types of dielectrically guided waves.

One arrangement of the special tube is shown in Fig. 1 in which 11 and 12 are two halves of a glass envelope which is more or less spherical in shape. These are separated by a metal septum 13 extending from the walls of the glass envelope sufficiently far to be electrically connected into a still larger metal sheet when necessary. The septum is perforated as shown in Fig. 1A so as to function as a grid through which electrons may pass. Lines of electric force on the other hand do not readily extend through these meshes except perhaps those associated with or attached to space electrons. A source of electrons 16, which in this case is a heated cathode, and also a plate 17 are located on opposite sides of the grid. The lead wires 14 and 15 to the cathode and plate, respectively, should preferably approach from diametrically opposite directions and preferably both are perpendicular to the plane of the grid 13.

The grid may be perforated by a series of circular holes as illustrated in Fig. 1A or it may consist of square or other shaped openings, such as might result from a basket weave of metallic wires.

Figure 1B:
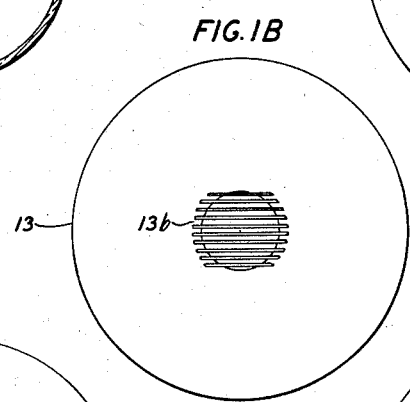
Figure 1C:
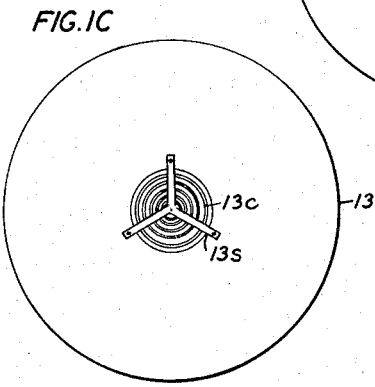
Figure 1D:
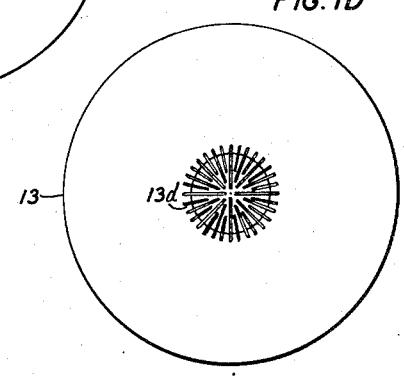

Fig. 1B shows a form of grid structure that is particularly adaptable to the so-called $H_1$ type of wave. When the metallic wires 13b of the grid are parallel to the transverse lines of electric force, little or no electric induction will take place through the grid from the input circuit to the output circuit or from the output back to the input. When they are perpendicular considerable induction will result. Thus the amount of feedback is controllable to a considerable extent. At intermediate angles only a moderate induction will take place. For similar reasons it will be apparent that the grids of Figs. 1C and 1D are adaptable for shielding against $H_0$ and $E_0$ types of waves respectively. In Fig. 1C the metallic wires comprising the grid are in the form of concentric rings 13c maintained in position in the aperture of the septum 13 by supporting structures 13s. In Fig. 1D the metallic wires comprising the grid are disposed radially as indicated at 13d. Recalling that in a symmetric magnetic or $H_0$ type wave the lines of electric force are circular, coaxial with the guide and transverse to the axis thereof, and that in a symmetric electric or $E_0$ type of wave the electrical field has a radial component, it is evident that the grid wires in Figs. 1C and 1D conform with these electric fields of the $H_0$ and $E_0$ types of waves, respectively.

Figure 2:
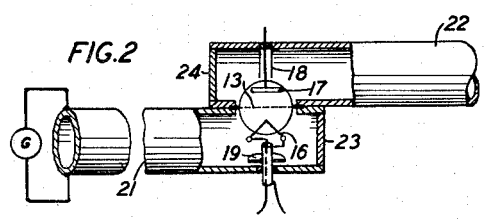
Fig. 2 is a simple form of amplifier circuit embodying a portion of my invention.

Fig. 2 shows in schematic form a longitudinal section of two cylindrical compartments connected together by one of the vacuum tubes illustrated by Fig. 1. Here the sections of the two cylindrical compartments which comprise the adjacent ends of two dielectric guides are shown as overlapping and having a boundary in common. The grid 13 of the amplifier is placed across an aperture in the common boundary and constitutes a portion of that boundary. The filament 16 is placed adjacent to the grid member in the incoming guide section 21 and the plate 17 is similarly placed in the outgoing guide section 22. The lead wires to the plate and filament pass through insulating bushings set in the walls of the guide, thus preventing short-circuiting the direct current or low frequency components flowing in the wires. Small by-pass condensers 18 and 19 prevent the high frequency waves residing in the guide from escaping through the bushings to the exterior. These by-pass condensers may take on a variety of forms, being represented conventionally in Fig. 2. Ordinarily it would be sufficient to have a small metal disc attached to each terminal and separated from the guide by a thin layer of dielectric, such as mica, or to have a metal sleeve connected to the guide wall and enclosing the lead or leads as in Fig. 4. In the illustrations that follow both bushings and the by-pass condensers will be omitted for purposes of simplification.

Waves, originating in a wave generator such as G of Fig. 2, advance from the left to the right in the cylindrical metal chamber 21 which comprises the incoming end of the dielectric guide, the dielectric guide in this case consisting preferably of a metal tube filled with a low loss dielectric which may be air. For $H_1$ waves a voltage difference exists between the top and bottom of the chamber 21 and the lines of electric force as they progress impinge upon the filament leads. By this means the voltage difference is communicated to the small space between filament 16 and grid 13. This will tend to either increase or decrease the electron flow between the filament and plate depending upon the polarity of this instantaneous voltage. The change of electron flow extends across the space between grid 13 and plate 17 and this induces in chamber 22 of the outgoing guide a new electromotive force and, consequently, a new set of waves, in general, of higher amplitude than those prevailing in chamber 21.

Figure 3:
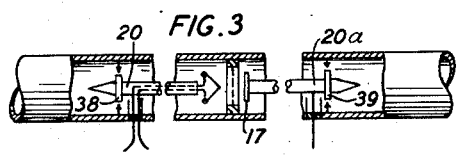
Fig. 3 is a modification of the circuit of Fig. 2.

Fig. 3 shows a modification of the arrangement of Fig. 2 in that the two sections of guides are arranged in abutment with the grid serving as a complete electrical separation between the two abutting sections except for such coupling as may occur through the grid mesh. In this figure the filament or electron source is adjacent to the grid on the incoming side and the plate on the outgoing side. Whereas the arrangement of Fig. 2 is particularly adapted to the $H_1$ type of wave, although applicable to other types of waves, the arrangement of Fig. 3 is particularly suitable for the $E_0$ type of wave in which the electric lines of force are radial. By means of the conductors 20 and 20a running out from the filament and the plate respectively such a type of wave is readily received from the incoming section on the filament and readily launched in the outgoing section, as will be understood by reference to my copending application Serial No. 701,711, filed December 9, 1933 which issued as U. S. Patent 2,129,712, September 13, 1938. The arrangement of Fig. 3 lends itself well to the use of a grid of one form or another, such as shown in Figs. 1A to 1D, whereby the input and the output will be effectively shielded from each other. The grids of Figs. 1C and 1D will suppress feedback of $H_0$ type and $E_0$ type of waves respectively to a very high degree, while at the same time tending to pass the $E_0$ type and the $H_0$ type of wave respectively.

While the filament and plate leads for the amplifier of Fig. 3 may be brought in through bushings with suitable by-pass condensers at a variety of points, it is desirable that this should be done at points where the variation in the electric field are a minimum and such points can be established by setting up standing waves which provide nodal points for the electric field. Such standing waves may be produced in the neighborhood of the filament by the disc 38 mounted axially and at a distance in front of the grid equivalent to a quarter wave or odd multiple thereof, this disc thus not merely reinforcing the field variations in the neighborhood of the grid but being itself a potential node. This point also becomes a natural point at which to place an iris, the function of which is described in my copending application, Serial No. 73,940, supra. Similarly the disc 39 and associated iris set up a potential node at the disc 39 reinforcing the potential variations on the plate and serving as a suitable point from which to take the plate lead. The quarter wavelength distances referred to may have to be appreciably altered when the capacities between the tube elements are substantial.

The circuits of Figs. 2 and 3 have been described primarily in terms of a triode amplifier but as indicated earlier this tube may be a multigrid tube. In this case the arrangement might very well be that shown in Fig. 4 in which three grids are shown. One of these would, in general, be an integral part of the guide wall and the others would be insulated therefrom for direct current effects but would be associated to any degree desired for high frequency effects through small capacities as indicated. These grids may be used in any order and in any such manner as is now well understood in connection with multi-grid tubes; being adapted through suitable leads to receive any direct current voltage desired. These leads would be insulated for direct current but not for alternating current effects just as for the filaments and plates. The septa of the various grids may extend as far out in various directions as may be desired in the light of the particular wave-lengths and particular wave types to be amplified.

Figure 5:
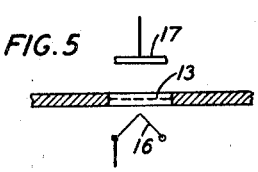
Fig. 5 is a conventional showing of the vacuum tube amplifier of Figs. 2 and 3 which will be used in many of the figures.
Figure 21:
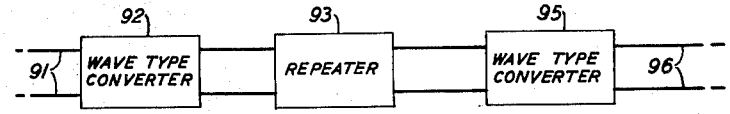

Hereinafter for purposes of simplicity the amplifier will be shown conventionally as in Fig. 5 and, in general, the two sections of guides will be shown as overlapping, but it is to be understood that in the invention either of the arrangements of Fig. 2 or 3 may be used and a tube of one form or another with a grid or grids of one form or another may be used, some of which tubes will be described in detail below. In all cases, except where otherwise described, the elements of the discharge device are enclosed within an envelope that is sealed to the grid septum as illustrated in Fig. 1.

In order to increase substantially the voltage impressed between filament and grid the distance between the filament 16 and the end wall 23 of Fig. 2 is made substantially one-fourth of the wave-length prevailing in the chamber 21. In a similar way the distance between the plate lead 17 and the end wall 24 of chamber 22 is made one-fourth of the wave-length prevailing in that chamber. When the latter condition has been met waves which pass to the left in chamber 22 will be reflected back in phase with those being propagated to the right. Neither of these dimensions can be specified precisely as being one-fourth wave-length for there are capacity and other effects associated with the filament and grid which are not predictable in advance. In practice, therefore, it is advisable to have these end plates take the form of movable pistons which may be adjusted to a maximum of amplified output or they may be adjusted to give any smaller desired amplified output. Such pistons are shown in Fig. 6.

A thermionic vacuum tube possesses both reactance and resistance and like other circuit elements operates best into its own characteristic impedance. Methods for approximating such impedances are disclosed in my copending application, Serial No. 73,940, referred to above and also in an application of King and Bowen, Serial No. 62,616, filed February 6, 1936. In Fig. 6 there is shown in longitudinal section an amplifier arrangement in which such an impedance match may be accomplished. The wave guide 21 terminates in the chamber 31 containing the grid-filament input to the amplifier. This chamber is bounded longitudinally by the movable piston 32 and the iris 33 which is adjustable as to size of aperture and position. Under these conditions the distances from the filament to iris and filament to piston, as well as that from iris to piston, can be adjusted as desired. By proper adjustment of these distances there will be a maximum power impressed between the filament and grid and a minimum of standing waves in the wave guide 21.

In precisely the same way that the input impedance may be matched to the wave guide to which it is connected so may the plate output of the amplifier also be matched to the guide 22. This latter is accomplished by means of the chamber 34 bounded by the movable piston 36 and movable iris 35.

It will be observed that the two chambers 31 and 34 of Fig. 6 are entirely divorced except for the coupling that may take place through the grid 13. Although this coupling will, in general, be small there may be conditions where it is sufficient to cause regeneration or possibly oscillations in the amplifier system. When such effects are not wanted they may be eliminated or controlled to the desired limit in the amplifier shown in Fig. 7. This arrangement is substantially the same as that of Fig. 6 except that an adjustable iris 40 is placed in the wall separating chambers 31 and 34. This iris permits a small amount of the amplified output resident in chamber 34 to escape back into chamber 31 to be combined with that about to be amplified. By so placing this orifice that the total distance from plate to orifice 40 and from orifice 40 to the filament is the equivalent of a half wave-length or any multiple thereof, it is evident that there will be impressed upon the grid-filament space a component of voltage exactly out of phase with that fed back through the meshes of the grid itself. By properly adjusting the opening of the iris the magnitude of this neutralizing voltage may be adjusted accordingly.

It is obvious, of course, that by properly spacing the iris relative to the thermionic vacuum tube any relative phasing may be obtained between the various components fed back upon the grid filament space and further by properly adjusting the size of the orifice their magnitudes may be controlled. Such a device, therefore, permits by appropriate adjustment of the following (1) complete neutralization (2) negative regeneration (3) positive regeneration and (4) oscillation.

Although the amplifier thus far shown discloses but one tube, two or more tubes connected for parallel operation could be used. Such an arrangement is shown in Fig. 8 in which two such tubes are shown, provision for proper phase reinforcement being made by so spacing the tubes that they are located 360, 720, etc. electrical degrees apart. Anti-singing coupling between the output and the input may also be here provided as indicated in Fig. 7.

Thus far nothing has been said regarding the cross-section of the guide sections 21 and 22. It is to be understood, however, that these sections, as well as the overlapping portions, may have any desired cross-section, such as a circular one or a rectangular one. There would be certain advantages in having a rectangular cross-section, especially in the portion where there is overlapping of the two sections. Also there is the implication that the guide 21 and the chamber 31 are of the same cross-section and that the chamber 31 is indeed but a continuation of the guide 21. The invention, however, is not to be limited in any such respect. Thus, Fig. 9 shows an arrangement in which the guides 21 and 22 may be circular in cross-section and the overlapping portions taken together are circular of the same dimensions with a diametral partition so that the chambers 31 and 34 are semi-circular in cross-section with a grid lying in the diametral septum. Semi-circular pistons 32 and 36 would perform the same function as the pistons of the previous figures.

Fig. 10 shows a push-pull combination of two tubes arranged as a circuit for amplification. Waves to be amplified advance from the left in the wave guide 21 into the bifurcated resonant chamber bounded by the adjustable iris 33 and the piston 32. This chamber also contains as a part of its wall the grids 13 and 13' and also filaments 16 and 16' of two independently connected vacuum tubes. By proper adjustment of the iris 33 relative to the piston 32 and the filaments 16 and 16' a desired portion of the input power may be impressed on the vacuum tubes in accordance with the principles already set forth. The corresponding output circuits of these tubes are tuned for an optimum by means of the pistons 36 and 36' and the irises 35 and 35', respectively. The output of this amplifier combination is led away through the wave guide 22.

When the arrangement of Fig. 10 is used with the $H_1$ type of wave it acts in the push-pull manner to balance out effects of non-linearity in the characteristics of the tubes, the grids 13 and 13' receiving opposite potentials with respect to their filaments. If, however, the incoming wave is of the $E_0$ type with radial lines of force, then the potentials of the grids are varied together and the structure behaves as one of two tubes connected in parallel. It will be evident also that in this Fig. 10 the plates and filaments may be interchanged. In that event, the relative directions of input and output are reversed. Obviously, the method of neutralization disclosed in connection with Fig. 7 may be applied here also.

Fig. 11 discloses a method of amplifying two bands of oppositely directed waves propagated in the same long wave guide. These might, for example, be different channels of television. In general, it is desirable that these two bands should differ in frequency. They may be designated respectively $f_1$ and $f_2$ with the understanding that each represents a fairly broad band of frequencies appropriate for whatever signal is to be transmitted. The group of frequencies designated as $f_1$ is propagated from left to right. At 41 it meets a bifurcation in the guide. The upper chamber bounded by iris 33 and piston 32 is so tuned as to readily accept this group of frequencies, whereas the lower chamber bounded by the iris 33' and the piston 32' tends to reject this band. It is true also that there is little tendency for such waves to pass beyond this chamber, since here they encounter the plate circuit of a vacuum tube instead of a grid circuit. The band of frequencies $f_1$ resonant in the chamber 42 is amplified and passed into the chamber 43 in accordance with principles already set forth and finally into the wave guide 32 where it is propagated to the right.

The group of frequencies $f_2$ arriving from the right similarly passes through chamber 42' which is tuned to that group, and thence into a similarly tuned chamber 43' and finally into the wave guide where it is propagated to the left. Thus, there is provided means for transmission from west to east and from east to west through an amplifying point without interference between the two bands of frequencies.

Figs. 12 to 14A disclose a two-way repeater similar to that of Fig. 11 except that the oppositely directed channels of communication may consist of similar bands of frequencies polarized in different planes, preferably at right angles to each other. These opposite or different states of polarization enable the two channels to be segregated for purposes of amplification. In Fig. 12, the group of frequencies entering chamber 51 from the left may be regarded as having the electric forces in the plane of the drawing. In addition there is another channel, using the same range of frequencies, leaving this chamber to the left. The electric forces of the latter are perpendicular to the plane of the drawing and, therefore, do not interfere with the first.

The first group of frequencies entering from the left is amplified and passed into chamber 52 and thence into chamber 53 through a parallel wire grating 56 or other suitable polarizing means shown in Fig. 12A, which grating is disposed at right angles to this electric force. This amplified wave is then propagated to the right along the wave guide connected to chamber 53 as appears in Fig. 14.

The wave train for the second channel of communication arrives along the last-mentioned wave guide into a chamber 53. It has its plane of polarization at right angles to the first wave and, consequently, is unable to enter chamber 52 because of the orientation of the wires of the grating 56. It may, however, pass through the wires of grating 57 into chamber 54 from which it passes, after amplification, into chamber 51, whence it is propagated in the wave guide leading to the left, all as is seen from inspection of Figs. 12 to 14. The external appearance of a group of rectangular guide sections is shown in Fig. 15.

In the interest of simplicity gratings of parallel wires have been assumed. Alternate and perhaps more effective means may be had by using either parallel plates as gratings or short sections of rectangular guides. In the latter case one of the dimensions is made so small as to discriminate markedly against the undesired components.

While the amplifiers of Figs. 2 and 3 will be responsive, to some extent at least, to any type of guided wave, they are particularly adapted for certain types of waves. Thus Fig. 2 lends itself especially well to both the $H_1$ and $E_0$ type of waves and the arrangement of Fig. 3 lends itself particularly well for the $E_0$ type of waves. Furthermore, it is possible to design other tube arrangements, particularly well adapted for still other types of waves. Thus Fig. 16 shows a tube design for $H_0$ waves.

Referring more particularly to Fig. 16, there is shown a cross-section of a portion of the guide system including the amplifier. The metal boundary 60 together with the radial planes, all shown in transverse section, divide the guide into octants 61 to 68. Between the octants 61 and 62, 63 and 64, etc. the radial conducting planes each contain a vacuum tube of the type already described. The latter is so connected that the normal electron flow in the four tubes progresses in the same circumferential direction, that is, clockwise as illustrated. The radial conducting planes between 62 and 63, etc. serve not only as dividing planes between the different amplifiers but also as convenient points for bringing in the respective filament and plate leads through suitable bushings and by-pass capacities. The arrangement thus results in alternate compartments containing filament and grid and grid and plate. These may then be regarded as input and output circuits of the amplifiers in parallel with the input and output circuits nearly completely shielded from each other.

Each compartment is bounded axially by a sector shaped piston (not shown) and an iris diaphragm shaped either as shown in Fig. 17 or 18. The compartments are so arranged that the irises of the input chambers face in one direction and the irises of the output chambers face in the other. These effectively isolate the input from the output circuits and at the same time are positioned to give the tuning described in connection with previous figures. It will be evident that the chambers 61 and 62 are roughly equivalent to chambers 31 and 34 of Fig. 6.

The opening of the sectored irises may be made adjustable as shown in Fig. 19 where two substantially similar sectors are made to overlap to such extent as desired, thus controlling the size of the iris aperture. It is evident that the compartments of Fig. 16 may be sectors as shown or may be altered to be triangular, rectangular or even circular in cross-section without materially altering the behavior of the device.

Fig. 20 shows still another form of tube which may be connected to be particularly effective for the $E_0$ type of waves. Here the incoming guide 71 with a section of axial conductor 72 brings the incoming wave to the input circuit of the vacuum tube comprising the cathode 74 and cylindrical grid 13, the cathode 74 being heated in any suitable manner, such as by the heater element 75. The plate circuit of this tube comprises the cathode 74 and the outer cylindrical sleeve 77 which then continues and becomes the outgoing guide 78, there being provided again the section of axial conductor 79 to assist in the launching of the outgoing wave. As is clearly seen from the figure the container for the vacuum tube comprises the metal sleeve 77 and the insulator portions 80 which may be of glass or other suitable material. It is desirable in this as in the previous cases to tune the input and output circuits. For the input circuit this is accomplished by the annular piston 81 and the iris 82. For the output circuit this is accomplished by the annular piston 83 and the iris 84.

In either Fig. 16 or 20 the details of the grid structure may be varied in the light of the particular type of wave being repeated as will be evident from the disclosure in connection with Figs. 1A to 1D.

In all these modifications of tubes it is to be observed that the grid serves to divide the vacuum tube into two chambers which are substantially shielded from each other.

While, as already pointed out, any one of these amplifiers with any form of grid will be receptive to some extent to all types of waves, each one is particularly well adapted for a special type of wave. Much latitude, however, is permissible as to the particular tube to be used for it is possible to take any incoming wave and convert it into a different type of wave and have this new wave impressed on the repeating or amplifying device. This is represented, for example, in Fig. 21 in which the incoming guide 91 is connected to a wave type converter 92 the output of which is then impressed on the amplifier 93. The output of this amplifier may then be sent out on the outgoing guide 96 or it may first be impressed on a wave type converter 95, which converter may restore the wave to the original type or to any other desired type. This feature of converting one wave type into another is fully disclosed in my copending application Serial No. 701,711 referred to above.

While this invention has been described thus far primarily in connection with amplification of a wave dielectrically guided from one terminal to another, the particular type of tube described and other principles shown can be effectively used for generating high frequency oscillations in which a primary factor is the presence of a suitable amplifier. Circuits of this kind will now be described. Referring to Fig. 22, there is shown a modification of the apparatus of Fig. 7 rendering it particularly suitable as an oscillator or generator of electric waves. One requirement for oscillations is that the conditions for neutralization previously mentioned be avoided. Two adjacent sections of dielectric guide are provided and in this case they are shown as overlapping with a common boundary between the compartments formed by these two sections and certain movable pistons. A vacuum tube amplifier with the input and the output circuits respectively in these two compartments is provided in the manner already described. An iris 40 provides coupling between the plate and the grid circuits, the position of this iris being such that the phase difference over its path between electric forces in the grid circuit and in the plate circuit should be nearer 0, 360, 720, etc. electrical degrees than 180, 540, etc. electrical degrees. In addition pistons 33' and 36' are provided thereby preventing any radiation from escaping by these routes and at the same time tuning the chambers to the frequency to be generated. This necessitates the provision of a power outlet consisting of a section of wave guide 62. The output into the section 62 may be controlled by an adjustable iris 61, the best location and the adjustment of this iris being such as to provide a good load impedance for the tube to operate into. Obviously it would be possible to combine the outlet 62 and the piston 33'.

Fig. 23 shows a further modification of this fundamental circuit whereby two or more thermionic tubes located 360 electrical degrees apart may effectively be operated in parallel to increase the power.

Fig. 24 shows how two or more thermionic tubes oppositely directed may be located at intervals of 180 electrical degrees to give increased power. While in this latter figure a coupling iris is shown, such an iris would not be necessary so far as merely setting up oscillations are concerned. If, however, the tubes are of substantially the same power then the power density in the chamber containing no outlet would become excessively high. Such an iris as shown at 40 is therefore desirable as providing means for oscillatory power to leave that chamber and pass down to the outlet 62. On the other hand, one of these tubes, say the one with the plate 17, might be a low power tube providing only about sufficient energy in its output circuit to take care of the losses inherent in its chamber. In general, it will be seen that it is not necessary that the tubes be of the same power output.

Figure 4:
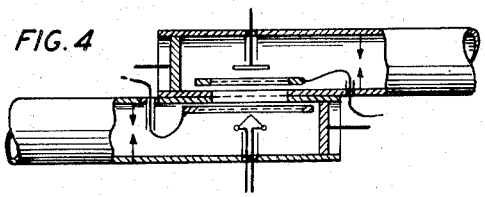
Fig. 4 shows a modification of the tube of Fig. 1.

The principles set forth above and the apparatus described lend themselves effectively for the use of both the amplification and the modulation functions of the vacuum tube amplifier. This is illustrated, for example, in Fig. 25 which permits modulation or harmonic generation. When so used the vacuum tube should be operated on a portion of its characteristic possessing curvature and this would ordinarily be accomplished by the use of a substantial negative bias applied to the grid. Such a biasing, by a battery or otherwise, is for simplicity omitted from the drawing but it is obvious that the grid would be insulated for direct current effects from the common metallic boundary between the overlapping chambers by means of such arrangements as are shown in Fig. 4. The direct current biasing voltage would then be provided through suitable bushings with small by-pass condensers as already explained. As is well known, a tube so biased and operating on the non-linear portion of its characteristic yields various modulation products including, in general, the sums and differences of all frequencies impressed on the grid circuit, as well as their respective harmonics.

In Fig. 25, for example, we may assume that there is impressed on the grid 13 two frequencies $f_1$ and $f_2$ coming from different directions as indicated by the arrows. These frequencies might, for example, be respectively 1750 megacycles and 2000 megacycles. There will then be produced in the plate circuit 17 all of the components mentioned above but by proper adjustment of the piston 36 and the iris 35 it is possible to select any one of these components, such, for example, as the sum of these frequencies or 3750 megacycles, which component will then be propagated in the wave guide 22.

It is to be understood, of course, that the frequencies represented by $f_1$ and $f_2$ may either or both be single frequencies or bands of frequencies. Thus the one might be a single or carrier frequency and the other a band of frequencies with which the carrier is to be modulated.

If a single frequency of say 2000 megacycles were impressed on the filament grid circuit various harmonics would, in general, appear in the output. By a proper adjustment of the iris 35 and the piston 36 one could select the several harmonics to the exclusion of the fundamental. Furthermore, by an appropriate restriction of the diameter of the output chamber circuit all harmonics below a certain order would be rejected. The principles by which such selection is made is described fully in my copending application Serial No. 745,457, filed September 25, 1934 which issued as U. S. Patent 2,106,768, February 1, 1938.

Fig. 26 shows an alternate method of producing modulation involving the plate circuits of two tubes. In this case the input frequencies or bands of frequencies $f_1$ and $f_2$ are shown as coming in on independent wave guides, each such wave guide containing the input circuit of an amplifier of the type already described. The output circuits of these two tubes are both contained in a common output wave guide and, inasmuch as these two output circuits react upon each other, there will appear the sum and difference frequencies. By the appropriate use of adjustable pistons and irises any one of these output components may be selected for propagation in the output wave guide.

While this invention has been described in terms of a limited number of specific applications, it is to be understood that many variations are possible. Thus, it is possible to make use of the nearly complete shielding between the input and output circuits of the thermionic tubes to launch the outgoing wave in a manner largely independent of the incoming wave. For example, on referring to Fig. 2, it is noted that the plate lead is shown as lying in the plane of the drawing and it was stated that if the incoming wave is of the $H_1$ type with the electric vector in the plane of the figure that the outgoing wave will be of the same form with the same plane of polarization. However, it should be pointed out that by changing the direction of the plate lead the outgoing wave, while still of the $H_1$ type, will be launched with its plane of polarization rotated with respect to the plane of polarization of the incoming wave.

Also, in connection with both Fig. 2 and Fig. 3, it will be apparent that a wide latitude is permissible in reshaping the outgoing wave either in plane of polarization or in type of wave, all of which will be evident by reference to my copending application 701,711 mentioned above.

While this invention has been described chiefly in terms of metallically shielded dielectric guides it is to be understood that it is also applicable to unshielded guides of various forms.

What is claimed is:

1. In a dielectrically guided wave system, a hollow guide for transmitting the waves, and means for amplifying the waves comprising an amplifier with an input and an output circuit contained within the guide.

2. In a dielectrically guided wave system, means for amplifying the transmitted wave comprising an amplifier with an input and an output circuit, the said circuits being shielded from each other except for the coupling through the grid.

3. In a dielectrically guided wave system, a hollow wave guide for transmitting the waves, and means for amplifying the waves comprising an amplifier with an input and an output circuit contained within the guide, the input and the output circuits being shielded from each other except for the coupling through the grid.

4. In a metallic pipe guide, a repeater comprising a three-electrode vacuum tube within the guide, means on one side to apply the electromotive force of incoming waves within the guide across the cathode and grid of said tube, and means on the other side to radiate into the interior of said guide lines of electric force from across the cathode and plate of said tube.

5. In combination, a metallic pipe guide, a repeater therein, means on the input side to match the input impedance of the repeater to the impedance of the guide, means on the output side to match the output impedance of the repeater to the impedance of the guide, and an adjustable feedback connection to neutralize any oscillatory tendency in the repeater.

6. In combination with a dielectric wave guide made up of two adjacent sections, a space charge device comprising a cathode within one section, an anode within the other section and a control element lying in the boundary between the two sections.

7. In combination with a dielectric wave guide comprising two overlapping hollow metal sections, a device for repeating and amplifying the wave from one guide section to the second section, said device comprising a cathode near the end of one guide section at the overlapping end, an anode in the overlapping end of the second section and a grid electrode lying in the boundary between the two overlapping sections.

8. The combination of claim 7, characterized by the fact that the grid electrode is so shaped and positioned as to permit selected types of dielectric waves to pass through.

9. The combination of claim 7, characterized by the fact that the grid member is connected metallically with the boundary of the guide whereby the input region and the output region of the repeating device are shielded from each other except for the grid portion.

10. In combination with a dielectric wave guide made up of two adjacent sections, a space charge device, comprising a cathode within one section, an anode within the other section, a conductive partition between the two sections with an aperture therein, and a grid element placed in said aperture.

11. In combination with a dielectric wave guide made up of two adjacent sections, a space charge device associated therewith, comprising a cathode, an anode and a grid element, a conductive partition lying in the boundary between the two sections, and an aperture in said boundary, one of the elements of the space charge device occupying the said aperture.

12. The combination of claim 10, characterized by the fact that the grid element comprises a mesh structure so configured with respect to the electric field configuration of a particular type of guided wave as to render the space charge device selectively responsive to that particular type of guided wave.

13. In combination with a dielectric wave guide made up of two adjacent sections, a vacuum tube amplifying device associated therewith, comprising a cathode within one section, an anode within the other section, and a grid element lying in the boundary between the two sections, the grid element having a mesh of such configuration with respect to the electric field configuration of a particular type of guided wave as to render the amplifying device selectively responsive to that particular type of guided wave.

14. In combination with a dielectric wave guide made up of two adjacent sections, a space charge device comprising a cathode within one section, an anode within the other section and a control element lying in the boundary between the two sections, and a common boundary element between the two sections, shielding the two sections each other electrically except for the control element.

15. In a dielectric wave guide system, means for amplifying waves traveling in the guide, said means comprising two sections of overlapping guides, and an amplifier consisting of a cathode in the overlapping end of the incoming section, an anode in the overlapping portion of the outgoing section and a grid element between the cathode and anode lying in the plane of the boundary common to the two overlapping ends.

16. In a dielectric guide system, means for amplifying waves traveling in the guide, said means comprising two sections of adjacent guides with a portion of the boundary in common, and an amplifier consisting of a cathode in the end of the incoming section, an anode in the adjacent end of the outgoing section, an aperture in the boundary common to the two sections and a grid element across the aperture, the aperture comprising the sole connection between the two guide sections.

17. The combination of claim 15, characterized by a metallic reflector at the overlapping end of the incoming section, the reflector being positioned to reinforce the potential variations across the input circuit of the amplifier.

18. The combination of claim 15, characterized by a metallic reflector at the free end of the overlapping outgoing section, the reflector being positioned to give reinforcement to the output wave.

19. The combination of claim 15, characterized by the fact that there is a reflector at the free end of the incoming section and a reflector at the free end of the outgoing section where these sections overlap, the reflectors being positioned to reinforce the potential variations in the input circuit and in the output circuit of the amplifier.

20. In a dielectric wave guide system, two overlapping sections of metallically bounded dielectric guides, a vacuum tube amplifying device between the two sections with the input circuit in one section and the output circuit in the other section, and a movable reflector at the overlapping free ends of the guide sections.

21. The combination of claim 15, characterized by the fact that there is an aperture in said boundary to yield a feedback coupling from the output to the input circuit.

22. In a dielectric wave guide system, two overlapping sections of metallically bounded dielectric guides, a three-element amplifying device between the two sections with the input circuit in one section and the output circuit in the other section, a reflector at the overlapping free end of the incoming section, and a reactor in the incoming guide in front of the input circuit of the amplifier, the position and reactance of the reactor being such as to give impedance matching between the incoming wave guide and the input circuit of the amplifier.

23. In a dielectric wave guide system, two overlapping sections of metallically bounded dielectric guides, a three-element amplifying device between the two sections with the input circuit in one section and the output circuit in the other section, a reflector at the overlapping free end of the outgoing guide section, and an apertured diaphragm following the anode of the amplifier, the size of the aperture and the position of the diaphragm being such as to give matching between the impedance of the output circuit of the vacuum tube and the impedance of the outgoing guide section.

24. In a dielectric wave guide system, two overlapping sections of metallically bounded dielectric guides, a three-element amplifying device between the two sections with the input circuit in one section and the output circuit in the other section, adjustable metallic reflectors at the overlapping free ends of the incoming and outgoing guide sections, the reflectors being positioned to produce maximum potential variations across the input and across the output circuits of the amplifier, and an apertured diaphragm in the incoming guide section and an apertured diaphragm in the outgoing guide section, the size of the apertures and the positions of the diaphragms being adjusted to give matching between the impedance of the incoming guide section and the input circuit of the amplifier and to give matching between the impedance of the output circuit of the amplifier and the impedance of the outgoing guide section.

25. The combination of claim 24, characterized by the fact that there is a coupling aperture in the boundary between the two overlapping sections.

26. The combination of claim 24, characterized by the fact that there is a coupling aperture in the boundary between the two guide sections, the size of the aperture and its position being such as to give desired magnitude and desired phase of coupling between the output and input circuits.

27. The combination of claim 15, characterized by the fact that there is a coupling aperture in the boundary common to the two guide sections, the aperture being so positioned as to give antisinging coupling between the output and input circuits of the amplifier.

28. The combination of claim 24, characterized by the fact that there is a coupling aperture in the boundary common to the two guide sections, the aperture being so positioned as to give antisinging coupling between the output and input circuits of the amplifier.

29. In a dielectric wave guide system, means for amplifying waves guided in said system, said means comprising a bifurcation in each guide section meeting at the amplifying point, the bifurcated ends of one section overlapping the bifurcated ends of the other section, and a vacuum tube amplifier associated with each overlapping portion, the amplifiers each being of the form described in claim 15.

30. In a dielectric wave guide system, means for amplifying oppositely-directed waves guided in said system, said means comprising a bifurcation in each guide section meeting at the amplifying point, the bifurcated ends of one section overlapping the bifurcated ends of the other section, and a vacuum tube amplifier in each overlapping portion, the amplifiers each being of the form described in claim 15, the free ends of the guide sections being closed by reflectors so adjusted in position as to give maximum reinforcement of potential variations in all input and output circuits.

31. In a dielectric wave guide system, means for amplifying dielectrically guided waves transmitted through said system in mutually opposite directions and in respective frequency ranges, said means comprising a bifurcation in each guide section meeting at the amplifying point, the bifurcated ends of one section overlapping the bifurcated ends of the other section, and a vacuum tube amplifier in each overlapping portion, the amplifiers each being of the form described in claim 15, there being an apertured diaphragm in front of each input circuit and an apertured diaphragm following each output circuit, the size of each aperture and its position being such as to give impedance matching between the incoming guide section and the input amplifier circuits and matching between the impedance of the output vacuum tube circuits and the impedance of the outgoing guide sections.

32. In a dielectric wave guide system adapted for transmission of dielectric guided waves in both directions but of different frequencies, a repeater point in said guide system comprising a bifurcation of the adjacent ends of the guide at the repeater point, the bifurcated sections being in overlapping relationship providing two parallel wave paths, and a vacuum tube amplifier of the type described in claim 15 in each path, one amplifier pointing in one direction and the other pointing in the other direction, whereby signals from east to west travel through and are amplified in the one path and signals from west to east travel through and are amplified in the other path.

33. In an oscillation generator of high frequency, two sections of metallic tubing adjacent to each other and with a common lateral boundary between the sections, and an amplifier with an input circuit in one of the said tubes and an output circuit in the other tube, the grid member being in the plane of a portion of the boundary common to the two tubes.

34. In an oscillation generator of high frequency, two sections of metallic tubing overlapping and with a common boundary in the overlapping portion, a vacuum tube with an input circuit in one of the said tubes and an output circuit in the other tube, the grid member being in the plane of a portion of the boundary common to the two tubes, and reflectors at the ends of each section positioned to give resonance for the frequency to be generated.

35. In an oscillation generator of high frequency, two sections of metallic tubing overlapping and with a common boundary in the overlapping portion, a vacuum tube with an input circuit in one of the said tubes and an output circuit in the other tube, and a grid member in the plane of a portion of the boundary common to the two tubes, and an apertured coupling between the two tubes in the boundary common to both and so positioned as to give singing phase relationship between the output and input circuits.

36. In a system utilizing dielectrically guided waves, two metallic pipes each enclosing a dielectric medium, the respective interiors of said pipes having a dielectric connection between them, shielding means comprising an apertured electrode extending wholly across said connection, a cooperating electrode on one side or the other of said apertured electrode, and means including said electrodes for establishing an energy transfer relation with guided waves in one of said pipes.

GEORGE CLARK SOUTHWORTH.